(12) United States Patent
Zhu et al.

(10) Patent No.: US 12,034,880 B2
(45) Date of Patent: Jul. 9, 2024

(54) AUDIO PLAYING METHOD, AUDIO PLAYING APPARATUS, AND STORAGE MEDIUM

(71) Applicant: SPREADTRUM COMMUNICATIONS (SHANGHAI) CO., LTD., Shanghai (CN)

(72) Inventors: Xiangang Zhu, Shanghai (CN); Long Chen, Shanghai (CN); Zewei Zhu, Shanghai (CN); Jiangsheng Shi, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 276 days.

(21) Appl. No.: 17/557,399

(22) Filed: Dec. 21, 2021

(65) Prior Publication Data
US 2022/0116492 A1    Apr. 14, 2022

Related U.S. Application Data

(63) Continuation of application No. PCT/CN2020/094896, filed on Jun. 8, 2020.

(30) Foreign Application Priority Data

Jun. 21, 2019   (CN) .......................... 201910544340.3

(51) Int. Cl.
*H04M 1/60*    (2006.01)
(52) U.S. Cl.
CPC ................................ *H04M 1/6066* (2013.01)

(58) Field of Classification Search
CPC ...... H04M 1/6066; H04S 7/308; H04S 1/005; H04R 5/033; H04R 2460/00
(Continued)

(56) References Cited

U.S. PATENT DOCUMENTS

| 10,244,307 | B1 | 3/2019 | Tong et al. |
| 2005/0208893 | A1 | 9/2005 | Yueh |
| 2009/0325492 | A1 | 12/2009 | Yang et al. |

FOREIGN PATENT DOCUMENTS

| CN | 105047209 A | 11/2015 |
| CN | 107333339 A | 11/2017 |

(Continued)

OTHER PUBLICATIONS

Translation of CN 108337074 from Dialog with figures from Google Translate done Nov. 17, 2023 (Year: 2023).*

(Continued)

*Primary Examiner* — Vivian C Chin
*Assistant Examiner* — Douglas J Suthers
(74) *Attorney, Agent, or Firm* — Davé Law Group, LLC; Raj S. Davé

(57) ABSTRACT

An audio playing method, an audio playing apparatus, and a storage medium are provided. The method includes the following. When a first Bluetooth earphone receives a first audio packet transmitted by a terminal, packet locking is performed on the terminal. When the first Bluetooth earphone and a second Bluetooth earphone complete synchronization of information for an initial audio packet, packet unlocking is performed on the terminal. The first Bluetooth earphone and the second Bluetooth earphone play synchronously a target audio from the initial audio packet according to multiple audio packets received.

19 Claims, 6 Drawing Sheets

(58) Field of Classification Search
USPC .......................................... 381/311, 74, 315
See application file for complete search history.

(56) References Cited

FOREIGN PATENT DOCUMENTS

| | | | |
|---|---|---|---|
| CN | 108111953 | A | 6/2018 |
| CN | 108271095 | A | 7/2018 |
| CN | 108337074 | A | 7/2018 |
| CN | 109391724 | A | 2/2019 |
| CN | 109391876 | A | 2/2019 |
| CN | 109660971 | A | 4/2019 |
| KR | 10-2018-0108310 | A | 10/2018 |

OTHER PUBLICATIONS

The Extended European Search Report issued in corresponding EP Application No. EP20826464.8, dated Jun. 20, 2022.
The First Office Action issued in corresponding CN Application No. CN201910544340.3, dated Oct. 29, 2020.
The International Search Report issued in corresponding International Application No. PCT/CN2020/094896, dated Aug. 31, 2020.
The First Office Action issued in corresponding KR Application No. KR10-2021-7041151, dated Jul. 21, 2023.

\* cited by examiner

AUDIO PLAYING METHOD, AUDIO PLAYING APPARATUS, AND STORAGE MEDIUM

CROSS-REFERENCE TO RELATED APPLICATION(S)

This application is a continuation of International Application No. PCT/CN2020/094896, filed on Jun. 8, 2020, which claims priority to Chinese Patent Application No. 201910544340.3, filed Jun. 21, 2019, the entire disclosures of which are hereby incorporated by reference.

TECHNICAL FIELD

This disclosure relates to the technical field of wireless communication, and in particular to an audio playing method, an audio playing apparatus, and a storage medium.

BACKGROUND

In related arts, for example, a Bluetooth earphone includes a left earphone and a right earphone. The Bluetooth earphone may be a headset, a headphone, an in-ear headphone, an earbud, etc. Upon detection of a start playing signal for a target audio at the terminal, the terminal transmits an audio packet corresponding to the target audio to the left earphone and the right earphone respectively. Accordingly, the left earphone and the right earphone receive the audio packet corresponding to the target audio. In case that the left earphone and the right earphone has synchronized clocks, the target audio corresponding to the audio packet is played synchronously at a target play time after a current time with delay processing.

However, in the above method, from a reception time of receiving the audio packet to the target play time, multiple audio packets received by the left earphone and the right earphone cannot be played in time and a packet loss rate is high, so that a latency in playing of the target audio is relatively large.

SUMMARY

An audio playing method, an audio playing apparatus, and a storage medium are provided in this disclosure.

In a first aspect, an audio playing method is provided. The method is applied to a wireless Bluetooth group. The wireless Bluetooth group includes a first Bluetooth earphone and a second Bluetooth earphone. The second Bluetooth earphone is at least one earphone other than the first Bluetooth earphone in the wireless Bluetooth group. The method includes the following.

When the first Bluetooth earphone receives a first audio packet transmitted by a terminal, packet locking is performed on the terminal. The terminal is configured to retransmit continuously the first audio packet to the wireless Bluetooth group and cache multiple audio packets corresponding to a target audio after the packet locking. The first audio packet is a first audio packet to-be-played corresponding to the target audio.

When the first Bluetooth earphone and the second Bluetooth earphone complete synchronization of information for an initial audio packet, packet unlocking is performed on the terminal. The terminal is configured to restore to transmit the multiple audio packets corresponding to the target audio to the wireless Bluetooth group after the packet unlocking.

The first Bluetooth earphone and the second Bluetooth earphone play synchronously the target audio from the initial audio packet according to the multiple audio packets received.

In another aspect of the present disclosure, an audio playing apparatus is provided. The apparatus is applied to a wireless Bluetooth group. The wireless Bluetooth group includes a first Bluetooth earphone and a second Bluetooth earphone. The second Bluetooth earphone is at least one earphone other than the first Bluetooth earphone in the wireless Bluetooth group. The apparatus includes at least one processor and a memory storing instructions which, when executed by the at least one processor, cause the at least one processor to perform packet locking on a terminal when the first Bluetooth earphone receives a first audio packet transmitted by the terminal, where the terminal is configured to retransmit continuously the first audio packet to the wireless Bluetooth group and cache a multiple audio packets corresponding to a target audio after the packet locking, and the first audio packet is a first audio packet to-be-played corresponding to the target audio; perform packet unlocking on the terminal when the first Bluetooth earphone and the second Bluetooth earphone complete synchronization of information for an initial audio packet, where the terminal is configured to restore to transmit the multiple audio packets corresponding to the target audio to the wireless Bluetooth group after the packet unlocking; play synchronously, through the first Bluetooth earphone and the second Bluetooth earphone, the target audio from the initial audio packet according to the multiple audio packets received.

In another aspect of the present disclosure, a non-volatile computer-readable storage medium is provided. The non-volatile computer-readable storage medium stores computer program instructions which, when executed by a processor, implement any of the above methods.

BRIEF DESCRIPTION OF THE DRAWINGS

The drawings included in the specification and constituting a part of the specification together with the specification illustrate exemplary embodiments, features, and aspects of the present disclosure, and are used to explain the principle of the present disclosure.

DETAILED DESCRIPTION

Figure 1:
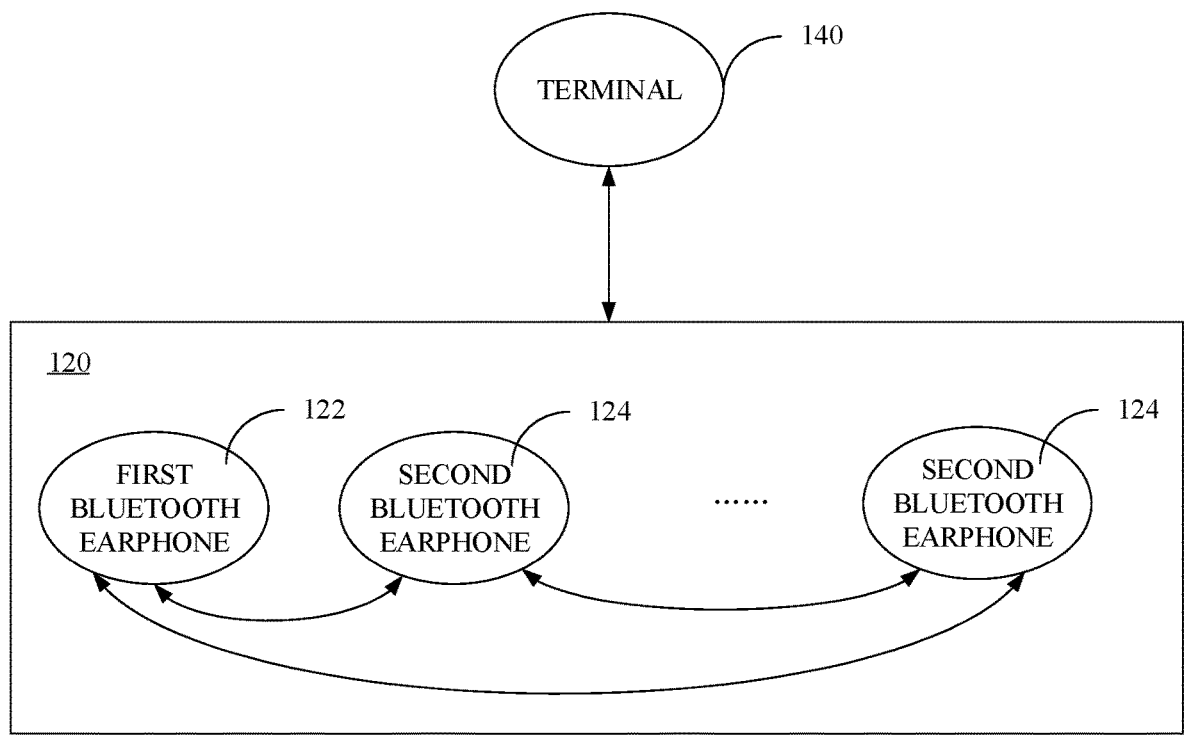
FIG. 1 is a schematic diagram illustrating an audio system provided in an embodiment of the present disclosure.

Hereinafter, various exemplary embodiments, features, and aspects of the present disclosure will be described in detail with reference to the drawings. The same reference numerals in the drawings indicate elements with the same or similar functions. Although various aspects of the embodiments are shown in the drawings, unless otherwise indicated, the drawings are not necessarily drawn to scale.

The term "exemplary" herein means "serving as an example, embodiment, or illustration". Any embodiment described herein as "exemplary" need not be construed as being superior or better than other embodiments.

In addition, in order to better illustrate the present disclosure, numerous specific details are given in the following specific embodiments. Those skilled in the art should understand that the present disclosure can also be implemented without certain specific details. In some instances, the methods, means, elements, and circuits that are well known to those skilled in the art have not been described in detail in order to highlight the gist of the present disclosure.

In related arts, from the time when the left and right earphone of the Bluetooth earphone receive the audio data packet to the target playing time, the multiple audio packets received cannot be played in time and the number of packets lost is high, which results in a large latency in playing of the target audio. In embodiments of the present disclosure, an audio playing method, an audio playing apparatus, and a storage medium are provided. When the first Bluetooth earphone in the wireless Bluetooth group receives the first audio packet, that is, the first audio packet to-be-played corresponding to the target audio, packet locking is performed on the terminal, so that the terminal retransmits continuously the first audio packet to the wireless Bluetooth group and caches the multiple audio packets corresponding to a target audio after the packet locking. In this way, the number of packets lost can be significantly reduced or even avoided. Depending on a local caching and retransmission mechanism for the target audio at the terminal, when the first Bluetooth earphone and the second Bluetooth earphone in the wireless Bluetooth group complete synchronization of information for the initial audio packet, the first Bluetooth earphone performs packet unlocking on the terminal, so that the terminal restores to transmit the multiple audio packets corresponding to the target audio to the wireless Bluetooth group after the packet unlocking. In this way, enough audio packets can be quickly delivered to the wireless Bluetooth group, so that the audio packets stored in the first Bluetooth earphone and the second Bluetooth earphone in the wireless Bluetooth group are able to be played soon. The target audio can be played synchronously starting from the initial audio packet, which can significantly reduce the latency in playing of the target audio.

Before explaining the embodiments of the present disclosure, the application scenario of the embodiments of the present disclosure are described first. FIG. 1 is a schematic diagram illustrating an audio system provided in an embodiment of the present disclosure.

The audio system includes a multi-component Bluetooth earphone 120 and a terminal 140.

The multi-component Bluetooth earphone 120 includes at least two Bluetooth earphone.

In embodiments of the present disclosure, the multi-component Bluetooth earphone 120 is a wireless Bluetooth group including a first Bluetooth earphone 122 and a second Bluetooth earphone 124.

Optionally, the first Bluetooth earphone 122 is a preset Bluetooth earphone in the wireless Bluetooth group.

Optionally, the first Bluetooth earphone is selected from the wireless Bluetooth group according to a preset selection policy. As an example, the preset selection policy includes: a Bluetooth earphone that is first power-on, or a Bluetooth earphone with a fastest data transmission speed among multiple Bluetooth earphones that are power-on simultaneously. The preset selection policy is not limited in the embodiments of the present disclosure.

The second Bluetooth earphone 124 is at least one Bluetooth earphone other than the first Bluetooth earphone 122 in the wireless Bluetooth group. Optionally, the second Bluetooth earphone 124 includes multiple second Bluetooth earphones 124.

It should be noted that FIG. 1 illustrates only two second Bluetooth earphones 124 as an example. The number of the second Bluetooth earphones 124 is not limited in the embodiments of the present disclosure.

Optionally, each of the first Bluetooth earphone and the second Bluetooth earphone can work individually, or the first Bluetooth earphone and the second Bluetooth earphone can also work together as a whole.

Optionally, a Bluetooth channel is established between any two Bluetooth earphones in the first Bluetooth earphone and the second Bluetooth earphone. Any two Bluetooth earphones synchronize data through the Bluetooth channel.

Optionally, the first Bluetooth earphone and the second Bluetooth earphone have synchronized Bluetooth clocks.

Optionally, each of the first Bluetooth earphone and the second Bluetooth earphone includes a Bluetooth module and a Bluetooth control (audio process control, APC) module (not shown in FIG. 1).

The Bluetooth module of each Bluetooth earphone is configured for data transmission with the terminal or other Bluetooth earphones.

Optionally, the Bluetooth module of each Bluetooth earphone is also configured to receive multiple audio packets of the target audio transmitted by the terminal, and transmit the audio packets to the APC module from an initial audio packet. Correspondingly, the APC module is configured to decode and play the audio packets after receiving the audio packet.

It should be noted that a pair of Bluetooth earphones usually includes two Bluetooth earphones. The above-mentioned "a Bluetooth earphone" refers to one Bluetooth earphone, rather than one pair of Bluetooth earphones.

The terminal 140 establishes a wireless connection with the multi-component Bluetooth earphone 120. The terminal 140 and the multi-ear Bluetooth earphone 120 transmit data through the wireless connection.

The terminal 140 can be a mobile phone, a tablet computer, an e-book reader, a moving picture experts group audio layer III (MP3) player, and a moving picture experts group audio layer IV (MP4) player, a laptop portable computer, a desktop computer, etc.

Optionally, the terminal 140 is configured to sequentially transmit multiple audio packets corresponding to the target audio to the multi-component Bluetooth earphone 120 upon detection of a start playing signal for the target audio. The multi-component Bluetooth earphone 120 is configured to feedback a response message to the terminal 140 or to feedback no response message. Correspondingly, the terminal 140 is also configured to receive the response message fed back by the multi-component Bluetooth earphone 120. The response message includes one of a NACK message or an ACK message.

Hereinafter, an exemplary embodiment is described to explain the audio playing method provided in the present disclosure.

Figure 2:
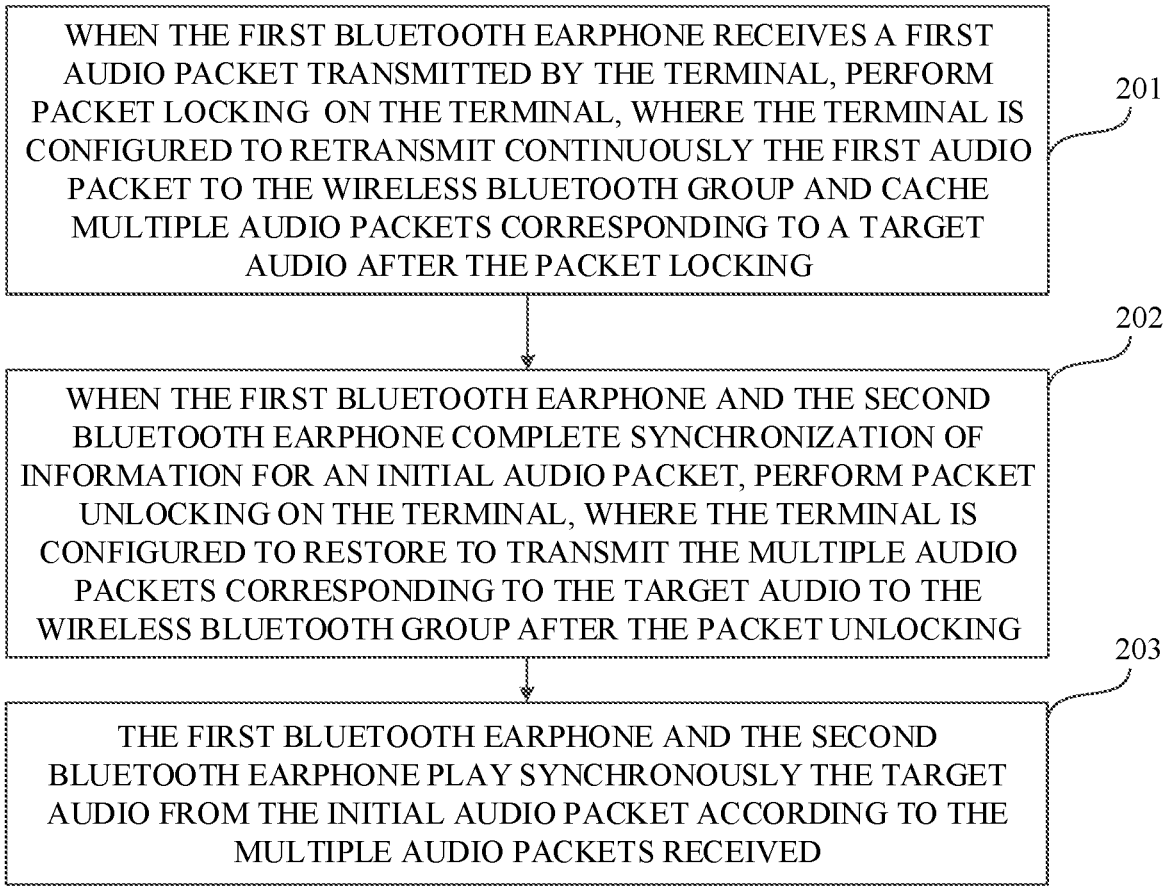
FIG. 2 is a flow chart illustrating an audio playing method provided in an embodiment of the present disclosure.

FIG. 2 is a flow chart illustrating an audio playing method provided in an embodiment of the present disclosure. The method is applied to the audio system provided in the above embodiment. The method includes the following.

At 201, when the first Bluetooth earphone receives a first audio packet transmitted by the terminal, packet locking is performed on the terminal. The terminal is configured to retransmit continuously the first audio packet to the wireless Bluetooth group and cache multiple audio packets corresponding to a target audio after the packet locking.

The first audio packet is a first audio packet to-be-played corresponding to the target audio.

Optionally, the terminal transmits the first audio packet to the wireless Bluetooth group. Accordingly, the first Bluetooth earphone and the second Bluetooth earphone in the wireless Bluetooth group receive the first audio packet.

Optionally, when the first Bluetooth earphone receives the first audio packet transmitted by the terminal, packet locking is performed on the terminal. The first Bluetooth earphone is a preset Bluetooth earphone in the wireless Bluetooth group.

After the terminal transmits the first audio packet to the wireless Bluetooth group, the wireless Bluetooth group performs packet locking on the terminal according to the control of the wireless Bluetooth group. After the packet locking, the terminal retransmits continuously the first audio packet to the wireless Bluetooth group. During the retransmission of the first audio packet, the terminal caches the multiple audio packets corresponding to the target audio.

At 202, when the first Bluetooth earphone and the second Bluetooth earphone complete synchronization of information for an initial audio packet, packet unlocking is performed on the terminal. The terminal is configured to restore to transmit the multiple audio packets corresponding to the target audio to the wireless Bluetooth group after the packet unlocking.

Optionally, after the first Bluetooth earphone receives the first audio packet transmitted by the terminal, the first Bluetooth earphone determines the information for the initial audio packet, and synchronizes the information for the initial audio packet to the second Bluetooth earphone. The information for the initial audio packet is used for indicating the initial audio packet when the first Bluetooth earphone and the second earphone play simultaneously.

Optionally, when the first Bluetooth earphone and the second Bluetooth earphone complete synchronization of information for the initial audio packet successfully, the wireless Bluetooth group performs packet unlocking on the terminal.

The packet unlocking is used to cancel the packet locking on the terminal. That is, the wireless Bluetooth group controls the terminal not to retransmit the first audio packet after the packet unlocking and to restore normal transmission of the multiple cached audio packets corresponding to the target audio.

Optionally, during the continuous retransmission process of the first audio packet from the terminal to the wireless Bluetooth group, after the wireless Bluetooth group performs the packet unlocking according to the control of the wireless Bluetooth group, the terminal restores to transmit the multiple audio packets corresponding to the target audio to the wireless Bluetooth group.

Optionally, the terminal restores normal transmission of the multiple cached audio packets corresponding to the target audio as follows. The terminal obtains the multiple cached audio packets corresponding to the target audio, and transmits the multiple audio packets corresponding to the target audio successively in a correct order.

At 203, the first Bluetooth earphone and the second Bluetooth earphone play synchronously the target audio from the initial audio packet according to the multiple audio packets received.

Optionally, the first Bluetooth earphone and the second Bluetooth earphone in the wireless Bluetooth group receive the multiple audio packets transmitted by the terminal. The multiple audio packets are received successively.

Optionally, on condition that the first Bluetooth earphone and the second Bluetooth earphone have synchronized Bluetooth clocks, the target audio is played synchronously starting from the initial audio packet.

Optionally, the first Bluetooth earphone and the second Bluetooth earphone obtain the initial audio packet indicated by the synchronized information for the initial audio packet, and play synchronously the target audio, starting from the initial audio packet.

In short, in the embodiments of the present disclosure, when the first Bluetooth earphone in the wireless Bluetooth group receives the first audio packet, that is, the first audio packet to-be-played corresponding to the target audio, packet locking is performed on the terminal, so that the terminal retransmits continuously the first audio packet to the wireless Bluetooth group and caches the multiple audio packets corresponding to a target audio after the packet locking. In this way, the number of packet lost can be significantly reduced or even avoided. Depending on a local caching and retransmission mechanism for the target audio at the terminal, when the first Bluetooth earphone and the second Bluetooth earphone in the wireless Bluetooth group complete synchronization of information for the initial audio packet, the first Bluetooth earphone performs packet unlocking on the terminal, so that the terminal restores to transmit the multiple audio packets corresponding to the target audio to the wireless Bluetooth group after the packet unlocking. In this way, enough audio packets can be quickly delivered to the wireless Bluetooth group, so that the audio packets stored in the first Bluetooth earphone and the second Bluetooth earphone in the wireless Bluetooth group are able to be played soon. The target audio can be played synchronously starting from the initial audio packet, which can significantly reduce the latency in playing of the target audio.

Figure 3:
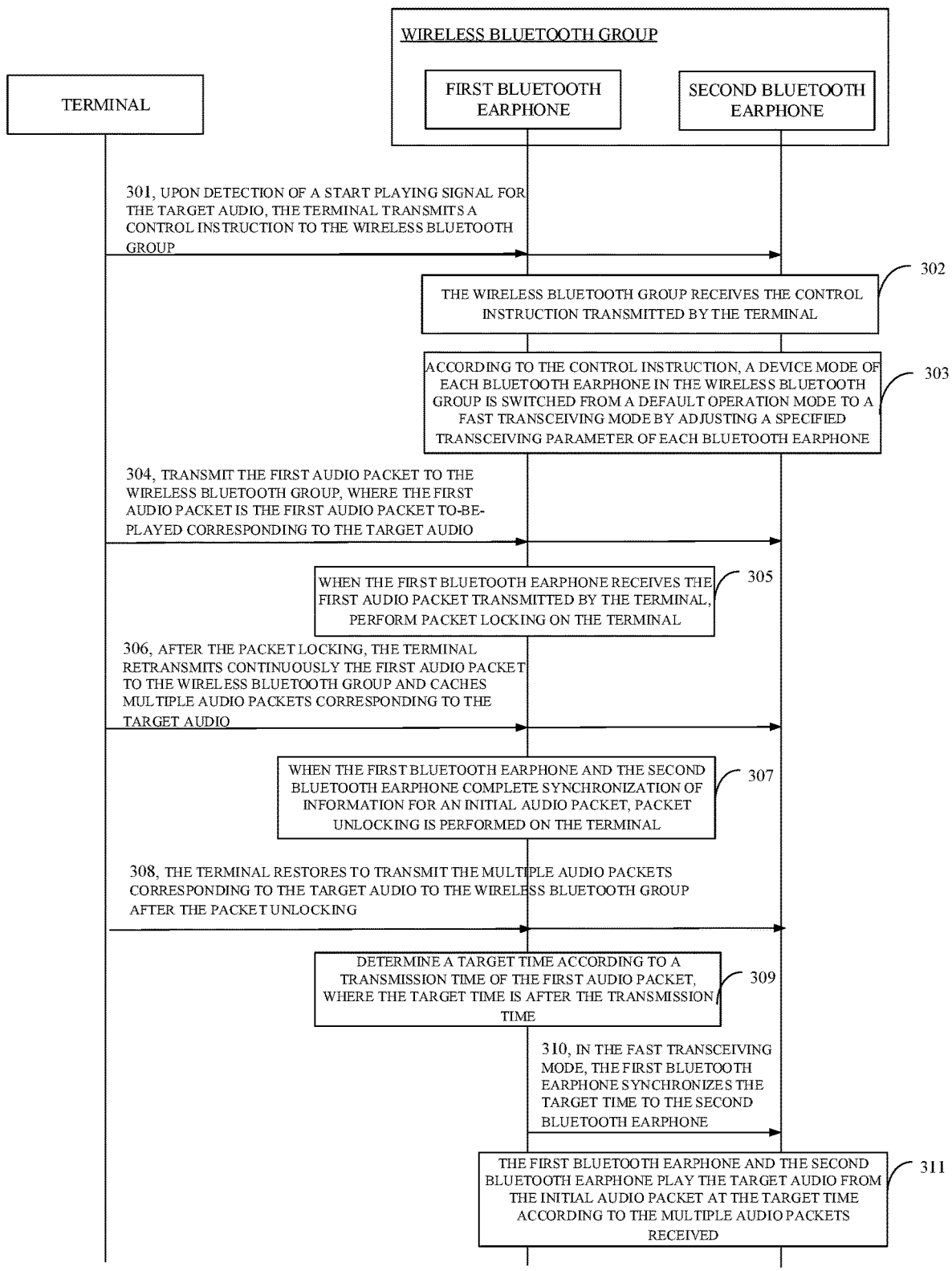
FIG. 3 is a flow chart illustrating an audio playing method provided in another embodiment of the present disclosure.

FIG. 3 is a flow chart illustrating an audio playing method provided in another embodiment of the present disclosure. The method is applied to the audio system in the above embodiment. The method includes the following.

At 301, upon detection of a start playing signal for the target audio, the terminal transmits a control instruction to the wireless Bluetooth group.

Optionally, upon detection of the start playing signal for the target audio, the terminal obtains a first audio packet to-be-played corresponding to the target audio, that is, the first audio packet, and transmits the first audio packet to the wireless Bluetooth group.

Optionally, the terminal detects the start playing signal for the target audio as follows. The terminal displays a user interface of an audio playing application, where an audio playing control for the target audio is displayed on the user interface. Then the terminal detects the start playing signal acting on the audio playing control. As an example, a type of the playing control includes at least one of a button, a controllable item, and a slider. The start playing signal includes any one or a combination of a click signal, a slide signal, a press signal, and a long press signal. The implementation of the start playing signal is not limited in the embodiment.

When the terminal detects the start playing signal for the target audio, the terminal transmits the control instruction to the wireless Bluetooth group. The control instruction is used to instruct the multiple Bluetooth earphones in the wireless Bluetooth group to initialize.

At 302, the wireless Bluetooth group receives the control instruction transmitted by the terminal.

The control instruction is transmitted by the terminal upon detection of the start playing signal for the target audio.

The wireless Bluetooth group receives the control instruction transmitted by the terminal, that is, each Bluetooth earphone in the wireless Bluetooth group receives the control instruction transmitted by the terminal.

At 303, according to the control instruction, a device mode of each Bluetooth earphone in the wireless Bluetooth group is switched from a default operation mode to a fast transceiving mode by adjusting a specified transceiving parameter of each Bluetooth earphone.

For each Bluetooth earphone in the wireless Bluetooth group, when the control instruction is received, playing status and a participating module of the Bluetooth earphone are initialized.

In order to speed up information interaction between the first Bluetooth earphone and the second Bluetooth earphone and achieve the information interaction between the respective Bluetooth earphones in a short time, each Bluetooth earphone is switched from the default operation mode to the fast transceiving mode by adjusting the specified transceiving parameter. A first data transceiving speed corresponding to the fast transceiving mode is higher than a second data transceiving speed corresponding to the default operation mode.

Optionally, the first data transceiving speed is a speed for transceiving data by the Bluetooth earphone in the fast transceiving mode. The second data transceiving speed is a speed for transceiving data by the Bluetooth earphone in the default operation mode. The speed for transceiving data is a speed for transceiving data between the first Bluetooth earphone and the second Bluetooth earphone during information interaction.

As an example, the fast transceiving mode is a sniff private subrating (SPSR) mode.

Optionally, the default operation mode is used to instruct the Bluetooth earphone to transmit or receive data every first time interval. The fast transceiving mode is used to instruct the Bluetooth earphone to transmit or receive data every second time interval. The second time interval is shorter than the first time interval. The specific values of the first time interval and the second time interval are not limited in this embodiment.

In a possible implementation, for each Bluetooth earphone in the wireless Bluetooth group, the device mode of the Bluetooth earphone is switched from the default operation mode to the fast transceiving mode according to the control instruction by modifying a parameter value of the specified transceiving parameter of the Bluetooth earphone from a first parameter value to a second parameter value. The second parameter value is less than the first parameter value. The specified transceiving parameter includes a sniff interval for transceiving data by the Bluetooth earphone.

Optionally, the sniff interval is a time interval in which the Bluetooth earphone keeps in the fast transceiving mode after the device mode are switched from the default operation mode to the fast transceiving mode.

Optionally, the parameter value of the sniff interval of the Bluetooth earphone is negatively correlated with the data transceiving speed of the Bluetooth earphone. That is, the smaller the parameter value of the sniff interval, and the smaller the time interval from the Bluetooth earphone disabling Bluetooth broadcast to next time when data transceiving is started, then the higher the data transceiving frequency of the Bluetooth earphone and the faster the transceiving speed.

At 304, the terminal transmits the first audio packet to the wireless Bluetooth group, where the first audio packet is the first audio packet to-be-played corresponding to the target audio.

The terminal obtains the first audio packet to-be-played corresponding to the target audio and transmits the first audio packet to the wireless Bluetooth group.

It should be noted that the operation at 304 can be performed after the operation at 301, or can be performed in parallel with the operation at 301, which is not limited in this embodiment.

At 305, when the first Bluetooth earphone receives the first audio packet transmitted by the terminal, packet locking is performed on the terminal.

Optionally, when the first Bluetooth earphone receives the first audio packet transmitted by the terminal, packet locking is performed on the terminal by transmitting a NACK message or skipping transmission of an ACK message to the terminal.

Optionally, when the first Bluetooth earphone receives the first audio packet transmitted by the terminal, packet locking is performed on the terminal by transmitting a message carrying a first specified identification. The first specified identification is preset for controlling the terminal to perform continuous retransmission.

How the first Bluetooth earphone performs packet locking on the terminal is not limited in this embodiment.

Optionally, the packet locking is used for controlling the terminal to retransmit continuously the first audio packet to the wireless Bluetooth group until the terminal receives an ACK message corresponding to the first audio packet.

At 306, after the packet locking, the terminal retransmits continuously the first audio packet to the wireless Bluetooth group and caches multiple audio packets corresponding to the target audio.

After the packet locking, the terminal retransmits continuously the first audio packet to the wireless Bluetooth group, and during the retransmission of the first audio packet, the terminal caches the multiple audio packets corresponding to the target audio.

A possible implementation for the terminal to continuously retransmit the first audio data packet to the wireless Bluetooth group after the packet locking includes but is not limited to the following two possible implementations.

In one possible implementation, when the terminal receives a NACK message transmitted from the wireless Bluetooth group, the terminal continuously retransmits the first audio packet to the wireless Bluetooth group.

In another possible implementation, when the terminal does not receive an ACK message transmitted from the wireless Bluetooth group within a preset time period after transmitting the first audio data packet, the terminal retransmits the first audio packet to the wireless Bluetooth group.

The preset time period is customized by a user or configured by the terminal by default, which is not limited in this embodiment.

At 307, when the first Bluetooth earphone and the second Bluetooth earphone complete synchronization of information for an initial audio packet, packet unlocking is performed on the terminal.

In order to ensure consistency of packets, the first Bluetooth earphone and the second Bluetooth earphone complete synchronization of information for the initial audio packet by, but not limited to, the following steps. The first Bluetooth earphone determines a packet-delay identification according to the first audio packet received, where the packet-delay identification is used for indicating the initial audio packet after the first audio packet. In the fast transceiving mode, the first Bluetooth earphone synchronizes the packet-delay identification to the second Bluetooth earphone. Once synchronization of the packet-delay identification is completed, packet unlocking is performed on the terminal.

Optionally, the first Bluetooth earphone determines the packet-delay identification according to the first audio packet received as follows. The first Bluetooth earphone obtains the packet-delay identification by adding one to a preset packet-delay threshold. As an example, the preset packet-delay threshold is two, so that the packet-delay identification can be obtained as three using the following expression: 1+2=3.

Since there is a latency between reception of the first audio packet at the first Bluetooth earphone and successful packet locking on the terminal, the first Bluetooth earphone may also receive other audio packets of the target audio transmitted by the terminal during this period of latency. Optionally, the first Bluetooth earphone obtains the packet-delay identification by adding the number of audio packets received to the preset packet-delay threshold. As an example, the preset packet-delay threshold is two and the number of audio packets received is two, then the packet-delay identification can be obtained as four using the following expression: 2+2=4. The specific value of the preset packet-delay threshold is not limited in this embodiment.

Optionally, in the fast transceiving mode, the first Bluetooth earphone transmits the packet-delay identification to multiple second Bluetooth earphones.

Optionally, an implementation for the wireless Bluetooth group to perform packet unlocking on the terminal includes, but is not limited to, the following two possible implementations.

In one possible implementation, the wireless Bluetooth group performs packet unlocking on the terminal by transmitting an ACK message to the terminal.

In another possible implementation, the wireless Bluetooth group performs packet unlocking on the terminal by transmitting a message carrying a second specified identification to the terminal. The second specified identification is preset for controlling the terminal to restore normal data transmission.

The implementation of the wireless Bluetooth group performing packet unlocking on the terminal is not limited in the embodiment. The first implementation of the wireless Bluetooth group performing packet unlocking on the terminal is taken as an example in the following.

Optionally, once the synchronization of the packet-delay identification is completed, the wireless Bluetooth group performs packet unlocking on the terminal as follows. When the first Bluetooth earphone receives a first ACK message transmitted from the second Bluetooth earphone, the first Bluetooth earphone performs packet unlocking on the terminal by transmitting a second ACK message to the terminal. The first ACK message is used for indicating that the second Bluetooth earphone receives the packet-delay identification successfully. The second ACK message is used for indicating that the first Bluetooth earphone receives the first audio packet successfully.

Optionally, in the fast transceiving mode, after the first Bluetooth earphone transmits the packet-delay identification to the multiple second Bluetooth earphones, for each of the multiple second Bluetooth earphones, the first ACK message is transmitted to the first Bluetooth earphone after successful reception of the packet-delay identification. Correspondingly, the first Bluetooth earphone receives the first ACK. When the first Bluetooth earphone receives the first ACKs corresponding to respective second Bluetooth earphones, the first Bluetooth earphone determines that the packet-delay identification is synchronized to the multiple second Bluetooth earphones successfully, and then transmits the second ACK to the terminal.

At 308, the terminal restores to transmit the multiple audio packets corresponding to the target audio to the wireless Bluetooth group after the packet unlocking.

Optionally, when the terminal receives the ACK message transmitted by the wireless Bluetooth group, the terminal stops retransmission of the first audio packet, and restores normal transmission of the cached multiple audio packets corresponding to the target audio.

Optionally, during continuous retransmission of the first audio packet from the terminal to the wireless Bluetooth group, when the terminal receives the ACK message transmitted by the wireless Bluetooth group, the terminal stops retransmission of the first audio packet. The terminal obtains the cached multiple audio packets corresponding to the target audio, and transmits the multiple audio packets sequentially to the wireless Bluetooth group.

At 309, the first Bluetooth earphone determines a target time according to a transmission time of the first audio packet, where the target time is after the transmission time.

Optionally, each of the first Bluetooth earphone and the second Bluetooth earphone includes a Bluetooth module and an APC module. The Bluetooth module of each Bluetooth earphone discards an audio packet received before the initial audio packet, and transmits audio packets to the APC module from the initial audio packet. After the APC module receives each audio packet, the ACP module decodes and plays the audio packet.

The APC module plays audio packets at a fixed audio sampling frequency. On condition that the audio packets in each Bluetooth earphone are ensured to be the same, it is necessary to guarantee that the APC modules start playing the initial audio data packet at the same time so as to ensure synchronization of data playing in multiple Bluetooth earphones. In a possible implementation, the first Bluetooth earphone determines the target time according to the transmission time of first audio packet as follows. The first Bluetooth earphone obtains the target time by adding the transmission time of the first audio packet to a preset duration threshold.

The specific value of the preset duration threshold is not limited in this embodiment.

Optionally, the transmission time of the first audio packet is a time when the Bluetooth module receives the first audio packet transmitted by the terminal. Alternatively, the transmission time of the first audio packet is a time when the Bluetooth module transmits the initial audio packet to the APC module.

Optionally, the target time is a time when the APC module decodes and plays the initial audio packet.

The specific value of the preset duration threshold is not limited in this embodiment. The way that the first Bluetooth earphone determines the target time is not limited in this embodiment.

At 310, in the fast transceiving mode, the first Bluetooth earphone synchronizes the target time to the second Bluetooth earphone.

Optionally, in the fast transceiving mode, the first Bluetooth earphone transmits the target time to multiple second Bluetooth earphones. Accordingly, the multiple second Bluetooth receive the target time respectively.

It should be noted that the operation at 309 and 310 may be executed after the operation at 307, or may be executed in parallel with the operation at 307, which is not limited in this embodiment.

At 311, the first Bluetooth earphone and the second Bluetooth earphone play the target audio from the initial audio packet at the target time according to the multiple audio packets received.

The first Bluetooth earphone and the second Bluetooth earphone in the wireless Bluetooth group receive the multiple audio packets transmitted by the terminal. For each of the first Bluetooth earphone and the second Bluetooth earphone, the APC module starts to decode and play the initial audio packet at the target time, so that the first Bluetooth earphone and the second Bluetooth earphone can achieve simultaneous playing of the target audio.

Optionally, after the first Bluetooth earphone and the second Bluetooth earphone play synchronously the target audio from the initial audio packet according to the multiple audio packets received, for each Bluetooth earphone in the wireless Bluetooth group, the device mode of the Bluetooth earphone is switched from the fast transceiving mode to the default operation mode.

Optionally, after playing synchronously the target audio from the initial audio packet, for each of the first Bluetooth earphone and the second Bluetooth earphone, the parameter value of the specified transceiving parameter of the Bluetooth earphone is switched from the second parameter value corresponding to the fast transceiving mode to the first parameter value corresponding to the first transceiving mode. The second parameter value is less than the first parameter value. The specified transceiving parameter includes the sniff interval for the Bluetooth earphone to transmit and receive data.

Figure 4:
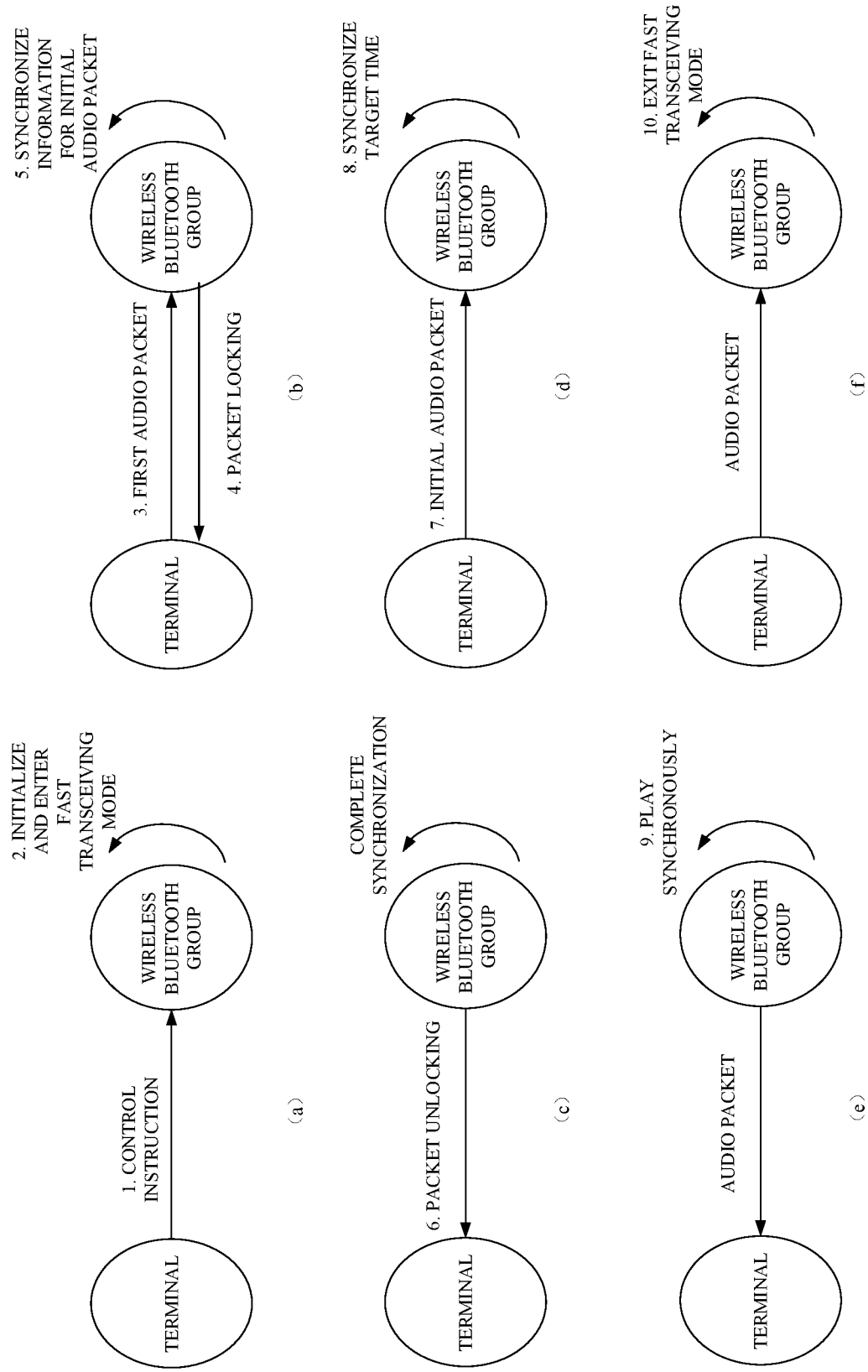
FIG. 4 is a schematic diagram illustrating a principle of an audio playing method provided in another exemplary embodiment of the present disclosure.
Figure 6:
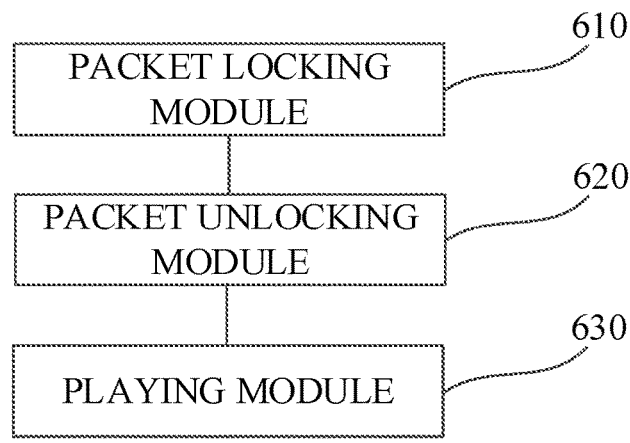
FIG. 6 is a schematic structural diagram illustrating an audio playing apparatus provided in an embodiment of the present disclosure.
Figure 7:
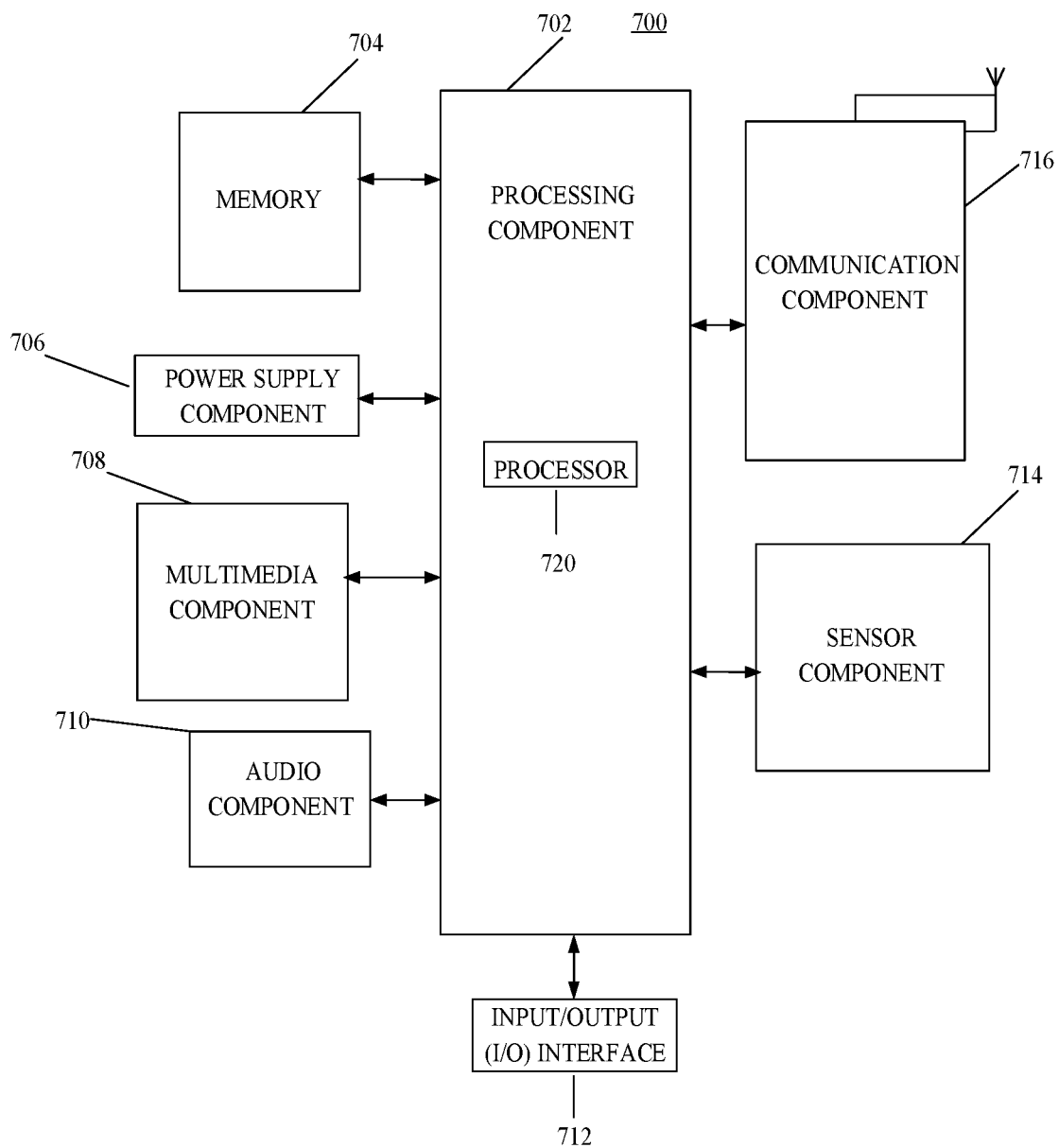
FIG. 7 is a block diagram illustrating an apparatus according to an exemplary embodiment.

FIG. 4 is a schematic diagram illustrating a principle of an audio playing method. The audio playing method includes but is not limited to the following. As illustrated in FIG. 4(a), 1. upon detection of the start playing signal for the audio packet, the terminal transmits a control instruction to the wireless Bluetooth group. 2. For each Bluetooth earphone in the wireless Bluetooth group, after receiving the control instruction transmitted by the terminal, the Bluetooth earphone initializes and enters the fast transceiving mode. As illustrated in FIG. 4(b), 3. the terminal transmits the first audio packet to the wireless Bluetooth group. 4. When the first Bluetooth earphone in the wireless Bluetooth group receives the first audio packet transmitted by the terminal, packet locking is performed on the terminal, so that the terminal retransmits continuously the first audio packet to the wireless Bluetooth group. 5. The first Bluetooth earphone synchronizes the information for the initial audio packet to the second Bluetooth earphone. As illustrated in FIG. 4(c), 6. When the first Bluetooth earphone and the second Bluetooth earphone complete synchronization of information for the initial audio packet, the first Bluetooth earphone performs packet unlocking on the terminal. As illustrated in FIG. 4(d), 7. the terminal stops retransmission of the first audio packet and restores to transmit the multiple audio packets (including the initial audio packet) corresponding to the target audio to the wireless Bluetooth group. 8. The first Bluetooth earphone determines the target time according to the transmission time of the first audio packet, and synchronizes the target time to the second Bluetooth earphone. As illustrated in FIG. 4(e), 9. the first Bluetooth earphone and the second Bluetooth earphone play synchronously the target audio from the initial audio packet at the target time according to the multiple audio packets received. As illustrated in FIG. 4(f), 10. after starting to play the target audio synchronously, each Bluetooth earphone in the wireless Bluetooth group exits the fast transceiving mode, that is, switches from the fast transceiving mode to the default operation mode.

In an embodiment, when the first Bluetooth earphone receives the first audio packet transmitted by the terminal, the first Bluetooth earphone performs packet locking on the terminal by transmitting a NACK message or transmitting no message to the terminal, so that the terminal retransmits continuously the first audio packet to the wireless Bluetooth group when receiving the NACK message or receiving no message for a time period, which ensures reliability of the packet locking.

Further, in an embodiment, when the first Bluetooth earphone and the second Bluetooth earphone complete synchronization of information for the initial audio packet, the first Bluetooth earphone performs packet unlocking on the terminal by transmitting an ACK message to the terminal, so that the terminal can restore in time to transmit the multiple audio packets corresponding to the target audio to the wireless Bluetooth group, which further ensures low latency in audio playing.

Further, in an embodiment, before receiving the first audio packet transmitted by the terminal, the wireless Bluetooth group switches a device mode of each Bluetooth earphone in the wireless Bluetooth group from the default operation mode to the fast transceiving mode according to the control instruction by adjusting the specified transceiving parameter of each Bluetooth earphone. Since the first data transceiving speed corresponding to the fast transceiving mode is higher than the second data transceiving speed corresponding to the default operation mode, information can be synchronized between the Bluetooth earphones in time, thus ensuring low latency in audio playing.

Further, in an embodiment, the first Bluetooth earphone determines the packet-delay identification according to the first audio packet received, where the packet-delay identification is used for indicating the initial audio packet after the first audio packet. In the fast transceiving mode, the first Bluetooth earphone synchronizes the packet-delay identification to the second Bluetooth earphone. The first Bluetooth earphone performs packet unlocking on the terminal once synchronization of the packet-delay identification is completed. In this way, the first Bluetooth earphone and the second Bluetooth earphone start to play from the same audio packet, so that consistency of audio packet playing can be achieved.

Further, in an embodiment, the first Bluetooth earphone determines the target time according to the transmission time of the first audio packet, where the target time is after the transmission time. In the fast transceiving mode, the first Bluetooth earphone synchronizes the target time to the second Bluetooth earphone. The first Bluetooth earphone and the second Bluetooth earphone play the target audio from the initial audio packet at the target time according to the multiple audio packets received. In this way, the first Bluetooth earphone and the second Bluetooth earphone can start to play at the same time from the same audio packet, so that synchronization of audio playing can be achieved in case of multiple independent Bluetooth earphones.

Figure 5:
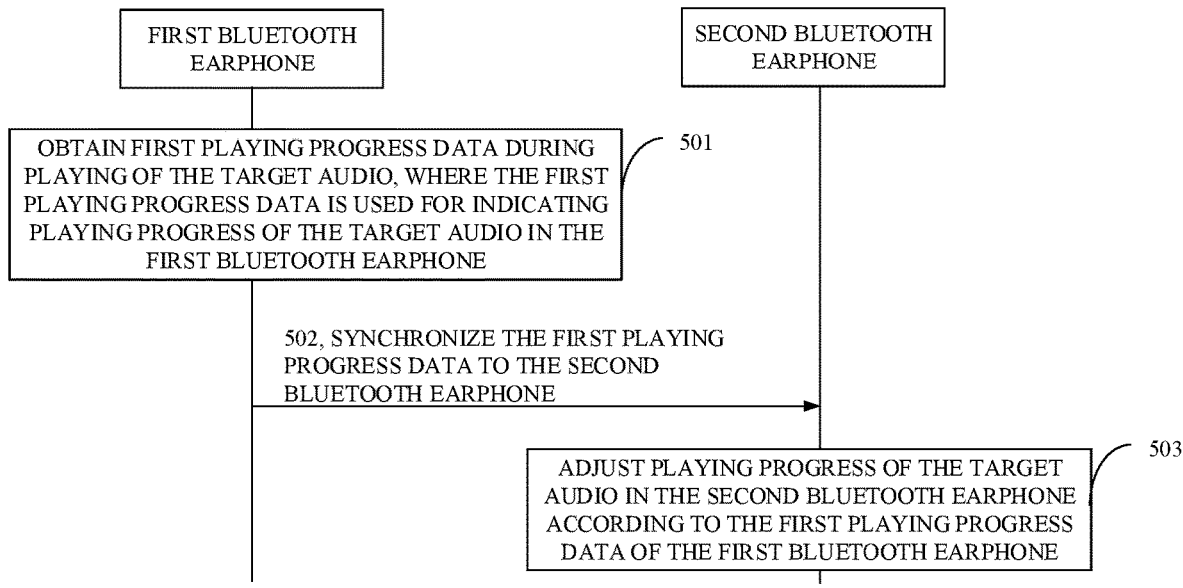
FIG. 5 is a flow chart illustrating an audio playing method provided in another embodiment of the present disclosure.

After the first Bluetooth earphone and the second Bluetooth earphone start playing the target audio synchronously, synchronization error accumulation may exist when playing for a long time, so that audio outputs between the first Bluetooth earphone and the second Bluetooth earphone will be out of synch. In this case, playing progress of the second Bluetooth earphone can be adjusted according to playing progress of the first Bluetooth earphone, so as to ensure synchronous playing between Bluetooth earphones during a long time period. In a possible implementation, in case that the first Bluetooth earphone and the second Bluetooth earphone have synchronous clocks, the following may further be executed after operation at 206 or 311, as illustrated in FIG. 5.

At 501, the first Bluetooth earphone obtains first playing progress data during playing of the target audio, where the first playing progress data is used for indicating playing progress of the target audio in the first Bluetooth earphone.

Optionally, at a preset adjusting time after the first Bluetooth earphone and the second Bluetooth start playing the target audio synchronously, the first Bluetooth earphone obtains the first playing progress data. An absolute value of a difference between the preset adjusting time and the time when synchronous playing of the target audio is started is a preset time difference.

Optionally, the first Bluetooth earphone and the second Bluetooth earphone have synchronous clocks. The first playing progress data includes a packet identifier of a second audio packet and first Bluetooth clock data corresponding to the second audio packet. The second audio packet is after the initial audio packet.

Optionally, the second audio packet is indicated by the preset packet identifier. The preset packet identifier is a preconfigured packet identifier after a packet identifier of the initial audio packet. For example, the preset packet identifier is 100. The specific value of the preset packet identifier is not limited in the embodiment.

Optionally, the second audio packet is an audio packet that is played at a preset playing time. The preset playing time is a preconfigured playing time after the start playing time of the target audio. The specific value of the preset playing time is not limited in the embodiment.

Optionally, the packet identifier of the second audio packet is used to identify uniquely the second audio packet among the multiple audio packets of the target audio. The first Bluetooth clock data is used for indicating a playing start time and/or a playing end time of the second audio packet in the first Bluetooth earphone.

Optionally, the first playing progress data further includes a sampling frequency for the first Bluetooth earphone to play the audio packets.

It should be noted that the first playing progress data is used for indicating the playing progress of the target audio in the first Bluetooth earphone. Types of data included in the first playing progress data are not limited in the embodiment.

At 502, the first Bluetooth earphone synchronizes the first playing progress data to the second Bluetooth earphone.

Optionally, the first Bluetooth earphone transmits the first playing progress data to the multiple second Bluetooth earphone.

At 503, the second Bluetooth earphone adjusts playing progress of the target audio in the second Bluetooth earphone according to the first playing progress data of the first Bluetooth earphone.

Each of the multiple second Bluetooth earphone receives the first playing progress data transmitted by the first Bluetooth earphone, and adjusts the playing progress of the target audio in the second Bluetooth earphone according to the first playing progress data.

Optionally, the second Bluetooth earphone obtains the packet identifier and the corresponding first Bluetooth clock data in the first playing progress data, and obtains second Bluetooth clock data corresponding to the packet identifier. The second Bluetooth clock data is used for indicating a playing start time and/or a playing end time of the second audio packet indicated by the packet identifier in the second Bluetooth earphone.

The second Bluetooth earphone compares the first Bluetooth clock data and the second Bluetooth clock data and adjusts the playing progress of the target audio in the second Bluetooth earphone according to the comparing result.

Optionally, when the comparing result is a first comparing result, the playing progress of the target audio in the second Bluetooth earphone is sped up. The first comparing result is used for indicating that for the target audio, the playing progress in the first Bluetooth earphone is faster than the playing progress in the second Bluetooth earphone. When the comparing result is a second comparing result, the playing progress of the target audio in the second Bluetooth earphone is slowed down. The second comparing result is used for indicating that for the target audio, the playing progress in the first Bluetooth earphone is slower than the playing progress in the second Bluetooth earphone.

Optionally, after the second Bluetooth earphone adjusts the playing progress of the target audio in the second Bluetooth earphone, the operations at 501 and 503 are executed every third time interval. The third time interval is preconfigured. The specific value of the third time interval is not limited in the embodiment.

In summary, in this embodiment, during playing of the target audio, the first Bluetooth earphone obtains the first playing progress data and synchronizes the first playing progress data to the second Bluetooth earphone. The second Bluetooth earphone adjusts playing progress of the target audio in the second Bluetooth earphone according to the first playing progress data of the first Bluetooth earphone. In this way, the accumulation of synchronization errors of long-time audio outputs in the first Bluetooth earphone and the second Bluetooth earphone can be avoided, which otherwise may cause the audio outputs to be out of sync. The playing progress in the second Bluetooth earphone is adjusted according to the playing progress in the first Bluetooth earphone, so as to ensure synchronized long-time playing between the Bluetooth earphones.

The following are apparatus embodiments of the embodiments of the present disclosure. For parts that are not described in detail in the apparatus embodiments, reference may be made to the technical details disclosed in the above method embodiments.

FIG. 6 is a schematic structural diagram illustrating an audio playing apparatus provided in an embodiment of the present disclosure. The audio playing apparatus can be implemented as all or part of a wireless Bluetooth group through software, hardware and a combination thereof. The wireless Bluetooth group includes a first Bluetooth earphone and a second Bluetooth earphone, and the second Bluetooth earphone is at least one Bluetooth earphone other than the first Bluetooth earphone in the wireless Bluetooth group. The audio playback apparatus includes a packet locking module 610, a packet unlocking module 620, and a playing module 630.

The packet locking module 610 is configured to perform packet locking on a terminal when the first Bluetooth earphone receives a first audio packet transmitted by the terminal, where the terminal is configured to retransmit continuously the first audio packet to the wireless Bluetooth group and cache a multiple audio packets corresponding to a target audio after the packet locking, and the first audio packet is a first audio packet to-be-played corresponding to the target audio.

The packet unlocking module 620 is configured to perform packet unlocking on the terminal when the first Bluetooth earphone and the second Bluetooth earphone complete synchronization of information for an initial audio packet, where the terminal is configured to restore to transmit the multiple audio packets corresponding to the target audio to the wireless Bluetooth group after the packet unlocking.

The playing module 630 is configured to play synchronously, through the first Bluetooth earphone and the second Bluetooth earphone, the target audio from the initial audio packet according to the multiple audio packets received.

In a possible embodiment, the packet locking module 610 is further configured to perform packet locking on the terminal by transmitting a NACK message or skipping transmission of an ACK message to the terminal, when the first Bluetooth earphone receives the first audio packet transmitted by the terminal.

In another possible embodiment, the packet unlocking module 620 is further configured to perform packet unlocking on the terminal by transmitting an ACK message to the terminal, when the first Bluetooth earphone and the second Bluetooth earphone complete synchronization of the information for the initial audio packet.

In another possible embodiment, the packet locking is used for controlling the terminal to retransmit continuously the first audio packet to the wireless Bluetooth group until the terminal receives an ACK message corresponding to the first audio packet.

In another possible embodiment, the apparatus further includes a mode control module. The mode control module is configured to receive a control instruction transmitted by the terminal, where the control instruction is transmitted by the terminal upon detection of a start playing signal for the target audio, and to switch a device mode of each Bluetooth earphone in the wireless Bluetooth group from a default operation mode to a fast transceiving mode according to the control instruction by adjusting a specified transceiving parameter of each Bluetooth earphone, where a first data transceiving speed corresponding to the fast transceiving mode is higher than a second data transceiving speed corresponding to the default operation mode.

In another possible embodiment, the mode control module is further configured to, for each Bluetooth earphone in the wireless Bluetooth group, switch the device mode of the Bluetooth earphone from the default operation mode to the fast transceiving mode according to the control instruction by modifying a parameter value of the specified transceiving parameter of the Bluetooth earphone from a first parameter value to a second parameter value, where the second parameter value is less than a first parameter value.

The specified transceiving parameter includes a sniff interval for transceiving data by the Bluetooth earphone.

In another possible embodiment, the packet unlocking module 620 is further configured to, for the first Bluetooth earphone, determine a packet-delay identification according to the first audio packet received, where the packet-delay identification is used for indicating the initial audio packet after the first audio packet; for the first Bluetooth earphone in the fast transceiving mode, synchronize the packet-delay identification to the second Bluetooth earphone; and perform packet unlocking on the terminal once synchronization of the packet-delay identification is completed.

In another possible embodiment, the packet unlocking module 620 is further configured to perform packet unlocking on the terminal by transmitting a second ACK message to the terminal, when the first Bluetooth earphone receives a first ACK message transmitted from the second Bluetooth earphone. The first ACK message is used for indicating that the second Bluetooth earphone receives the packet-delay identification successfully, and the second ACK message is used for indicating that the first Bluetooth earphone receives the first audio packet successfully.

In another possible embodiment, the playing module 630 is further configured to, for the first Bluetooth earphone, determine a target time according to a transmission time of the first audio packet, wherein the target time is after the transmission time; for the first Bluetooth earphone in the fast transceiving mode, synchronize the target time to the second Bluetooth earphone; and for the first Bluetooth earphone and the second Bluetooth earphone, play the target audio from the initial audio packet at the target time according to the multiple audio packets received.

In another possible embodiment, the apparatus further includes a mode switching module. The mode switching module is configured to, for each Bluetooth earphone in the wireless Bluetooth group, switch the device mode of the Bluetooth earphone from the fast transceiving mode to the default operation mode.

In another possible embodiment, the apparatus further includes an adjusting module. The adjusting module is configured to obtain, by the first Bluetooth earphone, first playing progress data during playing of the target audio, where the first playing progress data is used for indicating playing progress of the target audio in the first Bluetooth earphone; synchronize, by the first Bluetooth earphone, the first playing progress data to the second Bluetooth earphone; and adjust, by the second Bluetooth earphone, playing progress of the target audio in the second Bluetooth earphone according to the first playing progress data of the first Bluetooth earphone.

In another possible embodiment, the first Bluetooth earphone and the second Bluetooth earphone have synchronized Bluetooth clocks. The first playing progress data comprises a packet identifier of a second audio packet and first Bluetooth clock data corresponding to the second audio packet. The first Bluetooth clock data is used for indicating a playing start time and/or a playing end time of the second audio packet in the first Bluetooth earphone. The second audio packet is after the initial audio packet.

It should be noted that when the apparatus provided in the above embodiments realizes its functions, the division of the above functional modules is used as only an example for illustration. In practical applications, the above functions can be allocated to be completed by different functional modules according to actual needs, i.e., the content structure of the apparatus is divided into different functional modules to complete all or part of the functions described above.

The specific manners for performing operations of each module in the apparatus in the foregoing embodiments have been described in detail in the embodiments related to the method, and detailed description will not be given here.

FIG. 7 is a block diagram illustrating an apparatus 700 according to an exemplary embodiment. For example, the apparatus 700 may be the terminal 140 provided in FIG. 1, such as a mobile phone, a computer, a digital broadcasting terminal, a messaging device, a game console, a tablet device, a medical device, a fitness device, a personal digital assistant, and so on.

Referring to FIG. 7, the apparatus 700 may include one or more of the following components: a processing component 702, a memory 704, a power supply component 706, a multimedia component 708, an audio component 710, an input/output (I/O) interface 712, a sensor component 714, and a communication component 716.

The processing component 702 generally controls the overall operations of the apparatus 700, such as operations associated with display, telephone calls, data communication, camera operations, and recording operations. The processing component 702 may include one or more processors 720 to execute instructions to complete all or part of the steps of the foregoing methods. In addition, the processing component 702 may include one or more modules to facilitate the interaction between the processing component 702 and other components. For example, the processing component 702 may include a multimedia module to facilitate the interaction between the multimedia component 708 and the processing component 702.

The memory 704 is configured to store various types of data to support the operations at the apparatus 700. Examples of these data include instructions for any application or method operated on the device 700, contact data, phone book data, messages, pictures, videos, etc. The memory 704 can be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power supply component 706 provides power to various components of the apparatus 700. The power supply component 706 may include a power management system, one or more power supplies, and other components associated with generation, management, and distribution of power for the apparatus 700.

The multimedia component 708 includes a screen that provides an output interface between the apparatus 700 and the user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 708 includes a front camera and/or a rear camera. When the apparatus 700 is in an operation mode, such as a shooting mode or a video mode, the front camera and/or the rear camera can receive external multimedia data. Each front camera and rear camera can be a fixed optical lens system or have focal length and optical zoom capabilities.

The audio component 710 is configured to output and/or input an audio signal. For example, the audio component 710 includes a microphone (MIC), and when the apparatus 700 is in the operation mode, such as a call mode, a recording mode, and a voice recognition mode, the microphone is configured to receive external audio signals. The received audio signal can be further stored in the memory 704 or sent via the communication component 716. In some embodiments, the audio component 710 further includes a speaker for outputting audio signals.

The I/O interface 712 provides an interface between the processing component 702 and a peripheral interface module. The above-mentioned peripheral interface module may be a keyboard, a click wheel, a button, and the like. These buttons may include, but are not limited to, home button, volume button, start button, and lock button.

The sensor component 714 includes one or more sensors for providing the apparatus 700 with various aspects of status assessment. For example, the sensor component 714 can detect the open/close status of the apparatus 700 and the relative positioning of components. For example, the component is the display and the keypad of the apparatus 700. The sensor component 714 can also detect the position change of the apparatus 700 or a component of the apparatus 700, the presence or absence of contact between the user and the device 700, the orientation or acceleration/deceleration of the apparatus 700, and the temperature change of the apparatus 700. The sensor component 714 may include a proximity sensor configured to detect the presence of nearby objects when there is no physical contact. The sensor component 714 may also include a light sensor, such as a CMOS or CCD image sensor, for use in imaging applications. In some embodiments, the sensor component 714 may also include an acceleration sensor, a gyroscope sensor, a magnetic sensor, a pressure sensor, or a temperature sensor.

The communication component 716 is configured to facilitate wired or wireless communication between the apparatus 700 and other devices. The apparatus 700 can access a wireless network based on a communication standard, such as Wi-Fi, 2G, or 3G, or a combination thereof. In an exemplary embodiment, the communication component 716 receives a broadcast signal or broadcast related information from an external broadcast management system via a broadcast channel. In an exemplary embodiment, the communication component 716 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 700 may be implemented by one or more application specific integrated circuits (ASIC), digital signal processors (DSP), digital signal processing equipment (DSPD), programmable logic devices (PLD), field programmable Implemented by a gate arrays (FPGA), controllers, microcontrollers, microprocessors, or other electronic components, so as to perform the above-mentioned methods.

In an exemplary embodiment, a non-volatile computer-readable storage medium is also provided, such as the memory 704 storing computer program instructions, which can be executed by the processor 720 of the device 700 to complete the foregoing methods.

The present disclosure also provides a non-volatile computer-readable storage medium on which computer program instructions are stored. When the computer program instructions are executed by a processor, the method executed by the wireless Bluetooth group in the above-mentioned various method embodiments is realized.

The present disclosure may be a system, method, and/or computer program product. The computer program product may include a computer-readable storage medium loaded with computer-readable program instructions for enabling a processor to implement various aspects of the present disclosure.

The computer-readable storage medium may be a tangible device that can hold and store instructions used by the instruction execution device. The computer-readable storage medium may be, for example, but not limited to, an electrical storage device, a magnetic storage device, an optical storage device, an electromagnetic storage device, a semiconductor storage device, or any suitable combination thereof. More specific examples (non-exhaustive list) of computer-readable storage media include: portable computer disks, hard disks, random access memory (RAM), read-only memory (ROM), erasable programmable read-only memory (EPROM) or flash memory), static random access memory (SRAM), portable compact disk read-only memory (CD-ROM), digital versatile disk (DVD), memory stick, floppy disk, mechanical encoding device, punch card or raised structure in groove with instructions stored on it, and any suitable combination of the above. The computer-readable storage medium used herein is not interpreted as a transient signal itself, such as radio waves or other freely propagating electromagnetic waves, electromagnetic waves propagating through waveguides or other transmission media (for example, light pulses through fiber optic cables), or electrical signals transmitted through wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network, and forwards the computer-readable program instructions for storage in the computer-readable storage medium in each computing/processing device.

The computer program instructions used to perform the operations of the present disclosure may be assembly instructions, instruction set architecture (ISA) instructions, machine instructions, machine-related instructions, microcode, firmware instructions, state setting data, or source code or object code written in any combination of one or more programming languages. The programming language includes object-oriented programming languages such as Smalltalk, C++, etc., and conventional procedural programming languages such as "C" language or similar programming languages. Computer-readable program instructions can be executed entirely on the user's computer, partly on the user's computer, executed as a stand-alone software package, partly on the user's computer and partly executed on a remote computer, or entirely on the remote computer or server. In the case of a remote computer, the remote computer can be connected to the user's computer through any kind of network, including a local area network (LAN) or a wide area network (WAN), or it can be connected to an external computer (for example, using an Internet service provider to connect to the user's computer). In some embodiments, an electronic circuit, such as a programmable logic circuit, a field programmable gate array (FPGA), or a programmable logic array (PLA), can be customized by using the status information of the computer-readable program instructions. The electronic circuit can execute computer-readable program instructions to implement various aspects of the present disclosure.

Various aspects of the present disclosure are described herein with reference to flowcharts and/or block diagrams of methods, apparatuses (systems), and computer program products according to embodiments of the present disclosure. It should be understood that each block of the flowcharts and/or block diagrams, and combinations of blocks in the flowcharts and/or block diagrams, can be implemented by computer-readable program instructions.

These computer-readable program instructions can be provided to the processor of a general-purpose computer, a special-purpose computer, or other programmable data processing device, thereby producing a machine that makes these instructions when executed by the processors of the computer or other programmable data processing devices, to produce a device that implements the functions/actions specified in one or more blocks in the flowcharts and/or block diagrams. It is also possible to store these computer-readable program instructions in a computer-readable storage medium. These instructions make computers, programmable data processing apparatuses, and/or other devices work in a specific manner. Thus, the computer-readable medium storing the instructions includes an article of manufacture, which includes instructions for implementing various aspects of the functions/actions specified in one or more blocks in the flowcharts and/or block diagrams.

It is also possible to load computer-readable program instructions on a computer, other programmable data processing device, or other equipment, so that a series of operation steps are executed on the computer, other programmable data processing device, or other equipment to produce a computer-implemented process, so that the instructions executed on the computer, other programmable data processing apparatus, or other equipment realize the functions/actions specified in one or more blocks in the flowcharts and/or block diagrams.

The flowcharts and block diagrams in the accompanying drawings show the possible implementation architecture, functions, and operations of the system, method, and computer program product according to multiple embodiments of the present disclosure. In this regard, each block in the flowchart or block diagram may represent a module, program segment, or part of an instruction, and the module, program segment, or part of an instruction contains one or more executable instructions for implementing the specified logic function. In some alternative implementations, the functions marked in the block may also occur in a different order from the order marked in the drawings. For example, two consecutive blocks can actually be executed substantially in parallel, or they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or actions or it can be realized by a combination of dedicated hardware and computer instructions.

The embodiments of the present disclosure have been described above, and the above description is exemplary, not exhaustive, and is not limited to the disclosed embodiments. Without departing from the scope and spirit of the described embodiments, many modifications and changes are obvious to those of ordinary skill in the art. The choice of terms used herein is intended to best explain the principles, practical applications, or technical improvements of the technologies in the market, or to enable other ordinary skilled in the art to understand the embodiments disclosed herein.

What is claimed is:

1. An audio playing method, applied to a wireless Bluetooth group comprising a first Bluetooth earphone and a second Bluetooth earphone, the second Bluetooth earphone being at least one earphone other than the first Bluetooth earphone in the wireless Bluetooth group, the method comprising:
  performing packet locking on a terminal when the first Bluetooth earphone receives a first audio packet transmitted by the terminal, wherein the packet locking is used for controlling the terminal to retransmit continuously the first audio packet to the wireless Bluetooth group and cache a plurality of audio packets corresponding to a target audio after the packet locking, and the first audio packet is a first audio packet to-be-played corresponding to the target audio;
  performing packet unlocking on the terminal when the first Bluetooth earphone and the second Bluetooth earphone complete synchronization of information for an initial audio packet, wherein the information for the initial audio packet is used for indicating the initial audio packet when the first Bluetooth earphone and the second earphone play simultaneously, the packet unlocking is used for controlling the terminal to restore to transmit the plurality of audio packets corresponding to the target audio to the wireless Bluetooth group after the packet unlocking, and the plurality of audio packets corresponding to the target audio comprise the initial audio packet;
  playing synchronously, by the first Bluetooth earphone and the second Bluetooth earphone, the target audio from the initial audio packet according to the plurality of audio packets received;
  obtaining, by the first Bluetooth earphone, first playing progress data during playing of the target audio, wherein the first playing progress data is used for indicating playing progress of the target audio in the first Bluetooth earphone;
  synchronizing, by the first Bluetooth earphone, the first playing progress data to the second Bluetooth earphone; and
  adjusting, by the second Bluetooth earphone, playing progress of the target audio in the second Bluetooth earphone according to the first playing progress data of the first Bluetooth earphone.

2. The method of claim 1, wherein performing packet locking on the terminal when the first Bluetooth earphone receives the first audio packet transmitted by the terminal comprises:
  performing packet locking on the terminal by transmitting a negative acknowledgement (NACK) message or skipping transmission of an acknowledgement (ACK) message to the terminal, when the first Bluetooth earphone receives the first audio packet transmitted by the terminal.

3. The method of claim 1, wherein performing packet unlocking on the terminal when the first Bluetooth earphone and the second Bluetooth earphone complete synchronization of the information for the initial audio packet comprises:
  performing packet unlocking on the terminal by transmitting an acknowledgement (ACK) message to the terminal, when the first Bluetooth earphone and the second Bluetooth earphone complete synchronization of the information for the initial audio packet.

4. The method of claim 1, wherein the packet locking is used for controlling the terminal to retransmit continuously the first audio packet to the wireless Bluetooth group until the terminal receives an acknowledgement (ACK) message corresponding to the first audio packet.

5. The method of claim 1, further comprising:
  before performing packet locking on the terminal when the first Bluetooth earphone receives the first audio packet transmitted by the terminal,
  receiving a control instruction transmitted by the terminal, wherein the control instruction is transmitted by the terminal upon detection of a start playing signal for the target audio; and
  switching each Bluetooth earphone in the wireless Bluetooth group from a default operation mode to a fast transceiving mode according to the control instruction by adjusting a specified transceiving parameter of each Bluetooth earphone, wherein a first data transceiving speed corresponding to the fast transceiving mode is higher than a second data transceiving speed corresponding to the default operation mode.

6. The method of claim 5, wherein switching each Bluetooth earphone in the wireless Bluetooth group from the default operation mode to the fast transceiving mode according to the control instruction by adjusting the specified transceiving parameter of each Bluetooth earphone comprises:
  for each Bluetooth earphone in the wireless Bluetooth group, switching the Bluetooth earphone from the default operation mode to the fast transceiving mode according to the control instruction by modifying a parameter value of the specified transceiving parameter of the Bluetooth earphone from a first parameter value to a second parameter value, wherein the second parameter value is less than a first parameter value, and wherein
  the specified transceiving parameter comprises a sniff interval for transceiving data by the Bluetooth earphone.

7. The method of claim 5, wherein performing packet unlocking on the terminal when the first Bluetooth earphone and the second Bluetooth earphone complete synchronization of the information for the initial audio packet comprises:
  determining, by the first Bluetooth earphone, a packet-delay identification according to the first audio packet received, wherein the packet-delay identification is used for indicating the initial audio packet after the first audio packet;
  synchronizing, by the first Bluetooth earphone in the fast transceiving mode, the packet-delay identification to the second Bluetooth earphone; and
  performing packet unlocking on the terminal once synchronization of the packet-delay identification is completed.

8. The method of claim 7, wherein performing packet unlocking on the terminal once the synchronization of the packet-delay identification is completed comprises:
  performing packet unlocking on the terminal by transmitting a second ACK message to the terminal, when the first Bluetooth earphone receives a first ACK message transmitted from the second Bluetooth earphone, wherein
  the first ACK message is used for indicating that the second Bluetooth earphone receives the packet-delay identification successfully, and the second ACK message is used for indicating that the first Bluetooth earphone receives the first audio packet successfully.

9. The method of claim 5, further comprising:
  after playing synchronously, by the first Bluetooth earphone and the second Bluetooth earphone, the target audio from the initial audio packet according to the plurality of audio packets received:
for each Bluetooth earphone in the wireless Bluetooth group, switching the Bluetooth earphone from the fast transceiving mode to the default operation mode.

10. The method of claim 1, wherein playing synchronously, by the first Bluetooth earphone and the second Bluetooth earphone, the target audio from the initial audio packet according to the plurality of audio packets received comprises:
determining, by the first Bluetooth earphone, a target time according to a transmission time of the first audio packet, wherein the target time is after the transmission time;
synchronizing, by the first Bluetooth earphone in the fast transceiving mode, the target time to the second Bluetooth earphone; and
playing, by the first Bluetooth earphone and the second Bluetooth earphone, the target audio from the initial audio packet at the target time according to the plurality of audio packets received.

11. The method of claim 1, wherein the first Bluetooth earphone and the second Bluetooth earphone have synchronized Bluetooth clocks, the first playing progress data comprises a packet identifier of a second audio packet and first Bluetooth clock data corresponding to the second audio packet, the first Bluetooth clock data is used for indicating a playing start time and/or a playing end time of the second audio packet in the first Bluetooth earphone, and the second audio packet is after the initial audio packet.

12. An audio playing apparatus, applied to a wireless Bluetooth group comprising a first Bluetooth earphone and a second Bluetooth earphone, the second Bluetooth earphone being at least one earphone other than the first Bluetooth earphone in the wireless Bluetooth group, the apparatus comprising:
at least one processor; and
a memory storing instructions which, when executed by the at least one processor, cause the at least one processor to:
perform packet locking on a terminal when the first Bluetooth earphone receives a first audio packet transmitted by the terminal, wherein the packet locking is used for controlling the terminal to retransmit continuously the first audio packet to the wireless Bluetooth group and cache a plurality of audio packets corresponding to a target audio after the packet locking, and the first audio packet is a first audio packet to-be-played corresponding to the target audio;
perform packet unlocking on the terminal when the first Bluetooth earphone and the second Bluetooth earphone complete synchronization of information for an initial audio packet, wherein the information for the initial audio packet is used for indicating the initial audio packet when the first Bluetooth earphone and the second earphone play simultaneously, the packet unlocking is used for controlling the terminal to restore to transmit the plurality of audio packets corresponding to the target audio to the wireless Bluetooth group after the packet unlocking, and the plurality of audio packets corresponding to the target audio comprise the initial audio packet;
play synchronously, through the first Bluetooth earphone and the second Bluetooth earphone, the target audio from the initial audio packet according to the plurality of audio packets;

obtain, through the first Bluetooth earphone, first playing progress data during playing of the target audio, wherein the first playing progress data is used for indicating playing progress of the target audio in the first Bluetooth earphone;
synchronize, through the first Bluetooth earphone, the first playing progress data to the second Bluetooth earphone; and
adjust, through the second Bluetooth earphone, playing progress of the target audio in the second Bluetooth earphone according to the first playing progress data of the first Bluetooth earphone.

13. The audio playing apparatus of claim 12, wherein the instructions executed by the at least one processor to perform packet locking on the terminal when the first Bluetooth earphone receives the first audio packet transmitted by the terminal are executed by the at least one processor to:
perform packet locking on the terminal by transmitting a negative acknowledgement (NACK) message or skipping transmission of an acknowledgement (ACK) message to the terminal, when the first Bluetooth earphone receives the first audio packet transmitted by the terminal.

14. The audio playing apparatus of claim 12, wherein the instructions executed by the at least one processor to perform packet unlocking on the terminal when the first Bluetooth earphone and the second Bluetooth earphone complete synchronization of the information for the initial audio packet are executed by the at least one processor to:
perform packet unlocking on the terminal by transmitting an acknowledgement (ACK) message to the terminal, when the first Bluetooth earphone and the second Bluetooth earphone complete synchronization of the information for the initial audio packet.

15. The audio playing apparatus of claim 12, wherein the packet locking is used for controlling the terminal to retransmit continuously the first audio packet to the wireless Bluetooth group until the terminal receives an acknowledgement (ACK) message corresponding to the first audio packet.

16. A non-transitory computer-readable storage medium storing computer program instructions which, when executed by a processor, cause the processor to:
perform packet locking on a terminal when the first Bluetooth earphone receives a first audio packet transmitted by the terminal, wherein the packet locking is used for controlling the terminal to retransmit continuously the first audio packet to the wireless Bluetooth group and cache a plurality of audio packets corresponding to a target audio after the packet locking, and the first audio packet is a first audio packet to-be-played corresponding to the target audio;
perform packet unlocking on the terminal when the first Bluetooth earphone and the second Bluetooth earphone complete synchronization of information for an initial audio packet, wherein the information for the initial audio packet is used for indicating the initial audio packet when the first Bluetooth earphone and the second earphone play simultaneously, the packet unlocking is used for controlling the terminal to restore to transmit the plurality of audio packets corresponding to the target audio to the wireless Bluetooth group after the packet unlocking, and the plurality of audio packets corresponding to the target audio comprise the initial audio packet;

play synchronously, through the first Bluetooth earphone and the second Bluetooth earphone, the target audio from the initial audio packet according to the plurality of audio packets;

obtain, through the first Bluetooth earphone, first playing progress data during playing of the target audio, wherein the first playing progress data is used for indicating playing progress of the target audio in the first Bluetooth earphone;

synchronize, through the first Bluetooth earphone, the first playing progress data to the second Bluetooth earphone; and adjust, through the second Bluetooth earphone, playing progress of the target audio in the second Bluetooth earphone according to the first playing progress data of the first Bluetooth earphone.

17. The non-transitory computer-readable storage medium of claim 16, wherein the computer program instructions executed by the processor to perform packet locking on the terminal when the first Bluetooth earphone receives the first audio packet transmitted by the terminal are executed by the processor to:

perform packet locking on the terminal by transmitting a negative acknowledgement (NACK) message or skipping transmission of an acknowledgement (ACK) message to the terminal, when the first Bluetooth earphone receives the first audio packet transmitted by the terminal.

18. The non-transitory computer-readable storage medium of claim 16, wherein the computer program instructions executed by the processor to perform packet unlocking on the terminal when the first Bluetooth earphone and the second Bluetooth earphone complete synchronization of the information for the initial audio packet are executed by the processor to:

perform packet unlocking on the terminal by transmitting an acknowledgement (ACK) message to the terminal, when the first Bluetooth earphone and the second Bluetooth earphone complete synchronization of the information for the initial audio packet.

19. The non-transitory computer-readable storage medium of claim 16, wherein the packet locking is used for controlling the terminal to retransmit continuously the first audio packet to the wireless Bluetooth group until the terminal receives an acknowledgement (ACK) message corresponding to the first audio packet.

* * * * *